US007961228B2

(12) United States Patent  
Yamada (10) Patent No.: US 7,961,228 B2
(45) Date of Patent: Jun. 14, 2011

(54) IMAGING APPARATUS AND METHOD FOR CONTROLLING EXPOSURE BY DETERMINING BACKLIGHT SITUATIONS AND DETECTING A FACE

(75) Inventor: Manabu Yamada, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 403 days.

(21) Appl. No.: 12/047,462

(22) Filed: Mar. 13, 2008

(65) Prior Publication Data

US 2008/0225136 A1 Sep. 18, 2008

(30) Foreign Application Priority Data

Mar. 14, 2007 (JP) .................... 2007-065587

(51) Int. Cl.
*H04N 5/235* (2006.01)
*H04N 5/228* (2006.01)
*G03B 7/00* (2006.01)
(52) U.S. Cl. ............... 348/230.1; 348/222.1; 348/362
(58) Field of Classification Search ............ 348/222.1, 348/229.1, 230.1, 362–5; 382/274
See application file for complete search history.

(56) References Cited

U.S. PATENT DOCUMENTS

| 7,469,072 B2 * | 12/2008 | Yano ............... 382/274 |
| 2006/0050158 A1 * | 3/2006 | Irie ............... 348/246 |
| 2006/0245007 A1 * | 11/2006 | Izawa et al. .......... 358/448 |
| 2008/0007634 A1 * | 1/2008 | Nonaka et al. ........ 348/234 |

FOREIGN PATENT DOCUMENTS

| JP | 2003-107555 | | 4/2003 |
| JP | 2004-201228 | | 7/2004 |
| JP | 2004-222160 | A | 8/2004 |
| JP | 2006-174106 | A | 6/2006 |
| JP | 2008-158425 | A | 7/2008 |
| JP | 2008-170932 | A | 7/2008 |
| JP | 2009-44293 | A | 2/2009 |

OTHER PUBLICATIONS

A Proposal of the Modified HSV Colour System Suitable for Human Face Extraction, The Journal of the Institute of Television Engineers of Japan, pp. 787-797, vol. 49, No. 6, 1995.
Extraction of Face Regions from Monochromatic Photographs, The Journal of the Institute of Electronics, Information and Communication Engineers, pp. 1625-1627, vol. 74-D, No. 11, 1991.
A Face Region Detection for a TV Phone and Its Effect, Image Lab, Japan Industrial Publishing Co, Ltd., 1991.

\* cited by examiner

*Primary Examiner* — Sinh Tran
*Assistant Examiner* — Daniel M Pasiewicz
(74) *Attorney, Agent, or Firm* — Dickstein Shapiro LLP (57) ABSTRACT

An imaging apparatus having an automatic exposure function includes: an imaging section which images a photographic subject, and which obtains image data according to the photographic subject; and a controller configured to: judge whether or not imaging conditions at the time of imaging by the imaging section are backlight conditions; perform a first exposure control in which a compensation for the backlight conditions is performed, when the imaging conditions are judged to be the backlight conditions; detect a face of a person from image data generated based on the image data obtained by the imaging section and on a result of the first exposure control; perform a light meter test on a face area of the detected face of the person as a light metering area; and perform a second exposure control in which an exposure-amount based on a result of the light meter test of the face of the person is calculated, and in which an exposure control for recording is performed based on the calculated exposure-amount.

13 Claims, 11 Drawing Sheets

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

FIG. 6

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

IMAGING APPARATUS AND METHOD FOR CONTROLLING EXPOSURE BY DETERMINING BACKLIGHT SITUATIONS AND DETECTING A FACE

CROSS REFERENCE TO RELATED APPLICATIONS

The present application is based on and claims priority from Japanese Application Number 2007-065587, filed on Mar. 14, 2007, the disclosure of which is hereby incorporated by reference herein its entirety.

BACKGROUND

The present invention relates to an imaging apparatus, and to an automatic exposure controlling method. More specifically, the present invention relates to an imaging apparatus having an automatic exposure function which can photograph a person at an appropriate exposure, even when photographing the person under backlight conditions, and to an automatic exposure controlling method thereof.

In an imaging apparatus such as a digital camera and so on, when photographing a person and so on under backlight conditions, they are generally photographed at an exposure-amount corresponding to a bright background. In this case, the person often comes out darkened in the bright background and can not be recognized clearly. Therefore, in an imaging apparatus having an automatic exposure device, there are techniques which determine an exposure corresponding to a face of a person even under backlight conditions. For example, there is an exposure controlling method such that a face of a person is detected within an image plane, a detected area is regarded as a light metering area, and an exposure is then determined by a light meter test result of the light metering area.

The invention disclosed in Japanese patent publication No. 2003-107555 is one of the exposure controlling methods as described above. Japanese patent publication No. 2003-107555 discloses an imaging apparatus with an automatic exposure function that has an imaging section, a face detector which detects a face of a person from image data obtained by the imaging section, a light metering section which performs a light meter test on the person detected by the face detector as a light metering area, and an exposure controller which calculates an exposure-amount based on a light metering result of the face of the person by the light metering section and performs an exposure control based on the calculated exposure-amount.

According to the invention disclosed in Japanese patent publication No. 2003-107555, an expected effect can be obtained, only when the face detector can accurately detect the face of the person However, for example, when photographing the person under backlight conditions, the face of the person is often darkened in a step of an exposure control before detecting the face of the person. When the face of the person is darkened, it is difficult to detect the face of the person and there may be a possibility that it is hard to adjust the exposure corresponding to the face of the person.

Therefore, there is another approach in which the face of the person can be accurately detected even under backlight conditions. The invention disclosed in Japanese patent publication No. 2004-201228 is one of such innovations, and relates to a face area detection method and to an apparatus thereof. The method is as follows. First, a plurality of light meter tests is performed with a change of conditions. Then, an image in which saturation in a skin-colored area is the highest is chosen from a plurality of images obtained by the plurality of the light meter tests. Thereafter, an area having a skin-colored hue in the image is detected and the obtained skin-colored area thereby is divided by the saturation. A shape recognition is then performed on the divided skin-colored area by the saturation and finally the face area is extracted.

In the face area detection method and the apparatus thereof as disclosed in Japanese patent publication No. 2004-201228, there is an innovation for accurately detecting a face of a person by performing complicated processes such as performing a plurality of light meter tests with a change of conditions, choosing an image in which saturation in the skin-colored area is the highest from a plurality of images obtained by the plurality of the light meter tests and so on. In addition, in Japanese patent publication No. 2004-201228, it is also disclosed that an extracted result of a face area can be used for brightness compensation and so on. Therefore, if the invention disclosed in Japanese patent publication No. 2004-201228 is incorporated in an imaging apparatus, it is possible to presume that a face of a person can be photographed at an appropriate exposure-amount even under backlight conditions. However, the invention disclosed in Japanese patent publication No. 2004-201228, as described above, has to perform complicated processes such as performing a plurality of light meter tests by the time a face area is extracted, analyzing these light meter test results and so on. Therefore, in the invention disclosed in Japanese patent publication No. 2004-201228, there is a problem such that an image processing circuit becomes complex and large and it becomes a cause of a rise in cost, and additionally it takes time to carry out the complicated processes and thereby a perfect shot may be missed.

SUMMARY

An object of the present invention is to provide an imaging apparatus and an automatic exposure controlling method, which can accurately detect a face of a person in an image plane and photograph the face of the person at an appropriate exposure, even under backlight conditions.

An imaging apparatus having an automatic exposure function according to an embodiment of the present invention comprises: an imaging section which images a photographic subject, and which obtains image data according to the photographic subject; and a controller configured to: judge whether or not imaging conditions at the time of imaging by the imaging section are backlight conditions; perform a first exposure control in which a compensation for the backlight conditions is performed, when the imaging conditions are judged to be the backlight conditions; detect a face of a person from image data generated based on the image data obtained by the imaging section and on a result of the first exposure control; perform a light meter test on a face area of the detected face of the person as a light metering area; and perform a second exposure control in which an exposure-amount based on a result of the light meter test of the face of the person is calculated, and in which an exposure control for recording is performed based on the calculated exposure-amount.

Preferably, the imaging apparatus further comprises a display which displays an image, wherein the controller is configured to perform a general exposure control for the image displayed on the display when the face of the person is detected by the first exposure control.

Preferably, the controller is configured to judge whether or not the imaging conditions are the backlight conditions by a luminance difference between a bright area and a dark area of the image data.

Preferably, the controller is configured to judge whether or not the imaging conditions are backlight conditions and perform the first exposure control when a shutter button is half-pressed.

Preferably, the controller is configured to judge whether or not the imaging conditions are the backlight conditions, perform the first exposure control, detect the face of the person, perform the light meter test on the face area of the detected face of the person, and perform the second exposure control, after the shutter button is half-pressed.

Preferably, the controller is configured to obtain the latest image data according to the photographic subject from the imaging section, judge whether or not the imaging conditions are the backlight conditions, perform the first exposure control based on the first exposure control performed when the shutter button is half-pressed, detect the face of the person, perform the light meter test on the face area of the detected face of the person, and perform the second exposure control, when the shutter button is full-pressed.

An automatic exposure control method for an imaging apparatus according to an embodiment of the present invention, the method comprises: imaging a photographic subject and obtaining image data according to the photographic subject; judging whether or not imaging conditions at the time of the imaging are backlight conditions; performing a first exposure control in which a compensation for the backlight conditions is performed, when the imaging conditions are judged to be the backlight conditions; detecting a face of a person from image data generated based on the image data and on a result of the first exposure control; performing a light meter test on a face area of the detected face of the person as a light metering area; and performing a second exposure control in which an exposure-amount based on a result of the light meter test of the face of the person is calculated, and in which an exposure control for recording is performed based on the calculated exposure-amount.

Preferably, the automatic exposure control method further comprises: displaying an image on a display by performing a general exposure control, when the face of the person is detected by the first exposure control.

Preferably, in the automatic exposure control method, whether or not the imaging conditions are the backlight conditions is judged by a luminance difference between a bright area and a dark area of the image data.

Preferably, in the automatic exposure control method, judging of whether or not the imaging conditions are the backlight conditions and performing of the first exposure control are carried out when a shutter button is half-pressed.

Preferably, in the automatic exposure control method, judging of whether or not the imaging conditions are the backlight conditions, performing of the first exposure control, detecting of the face of the person, performing of the light meter test on the face area of the detected face of the person, and performing of the second exposure control, are carried out after the shutter button is half-pressed.

Preferably, in the automatic exposure control method, obtaining of the latest image data according to the photographic subject from the imaging section, judging of whether or not the imaging conditions are the backlight conditions, performing of the first exposure control based on the first exposure control performed when the shutter button is half-pressed, detecting of the face of the person, performing of the light meter test on the face area of the detected face of the person, and performing of the second exposure control, are carried out when the shutter button is full-pressed.

An imaging apparatus having an automatic exposure function according to an embodiment of the present invention, comprises: imaging means for imaging a photographic subject, and for obtaining image data according to the photographic subject; backlight judging means for judging whether or not imaging conditions at the time of imaging by the imaging means are backlight conditions; first exposure controlling means for performing a first exposure control in which a compensation for the backlight conditions are performed, when the imaging conditions are judged to be the backlight conditions by the backlight judging means; face detecting means for detecting a face of a person from image data generated based on the image data obtained by the imaging means and on a result of the first exposure control by the first exposure controlling means; light metering means for performing a light meter test on a face area of the face of the person detected by the face detecting means as a light metering area; and second exposure controlling means for performing a second exposure control in which an exposure-amount based on a result of the light meter test of the face of the person by the light metering means is calculated, and in which an exposure control for recording is performed based on the calculated exposure-amount.

DETAILED DESCRIPTION OF THE PREFERRED EMBODIMENTS

Hereinafter, with reference to the drawings, embodiments 1 and 2 of an imaging apparatus and an automatic exposure controlling method according to the present invention will be explained in detail. Numerals in each drawing are used for the same members and processes where necessary.

Embodiment 1

[An Explanation of a Camera System]

Figure 1:
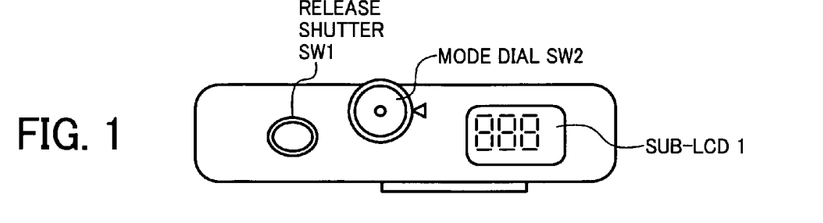
FIG. 1 is a plane view illustrating an example of a camera as an imaging apparatus according to an embodiment 1 of the present invention.
Figure 2:
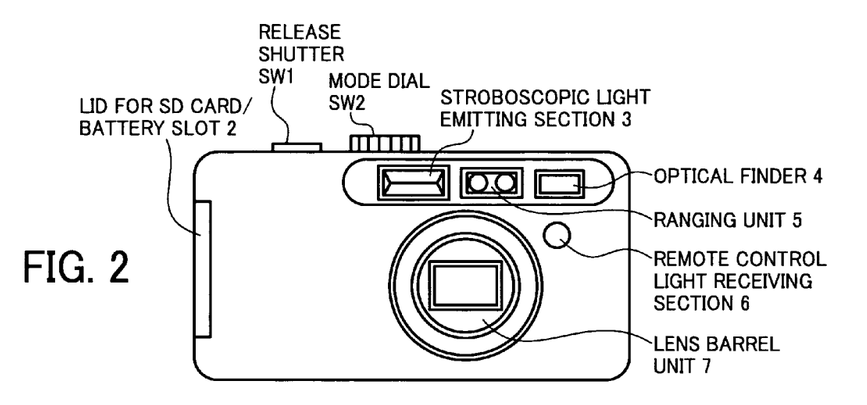
FIG. 2 is a front view of the camera.
Figure 3:
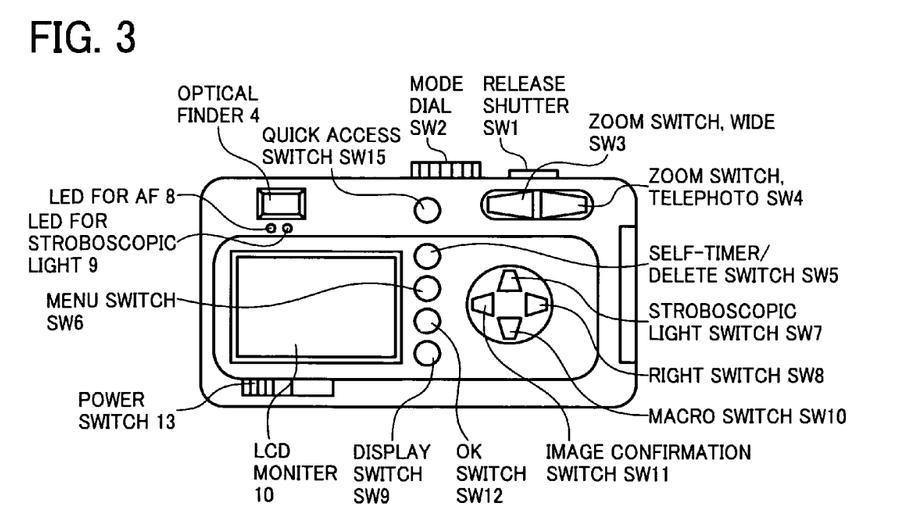
FIG. 3 is a back view of the camera.
Figure 4A:
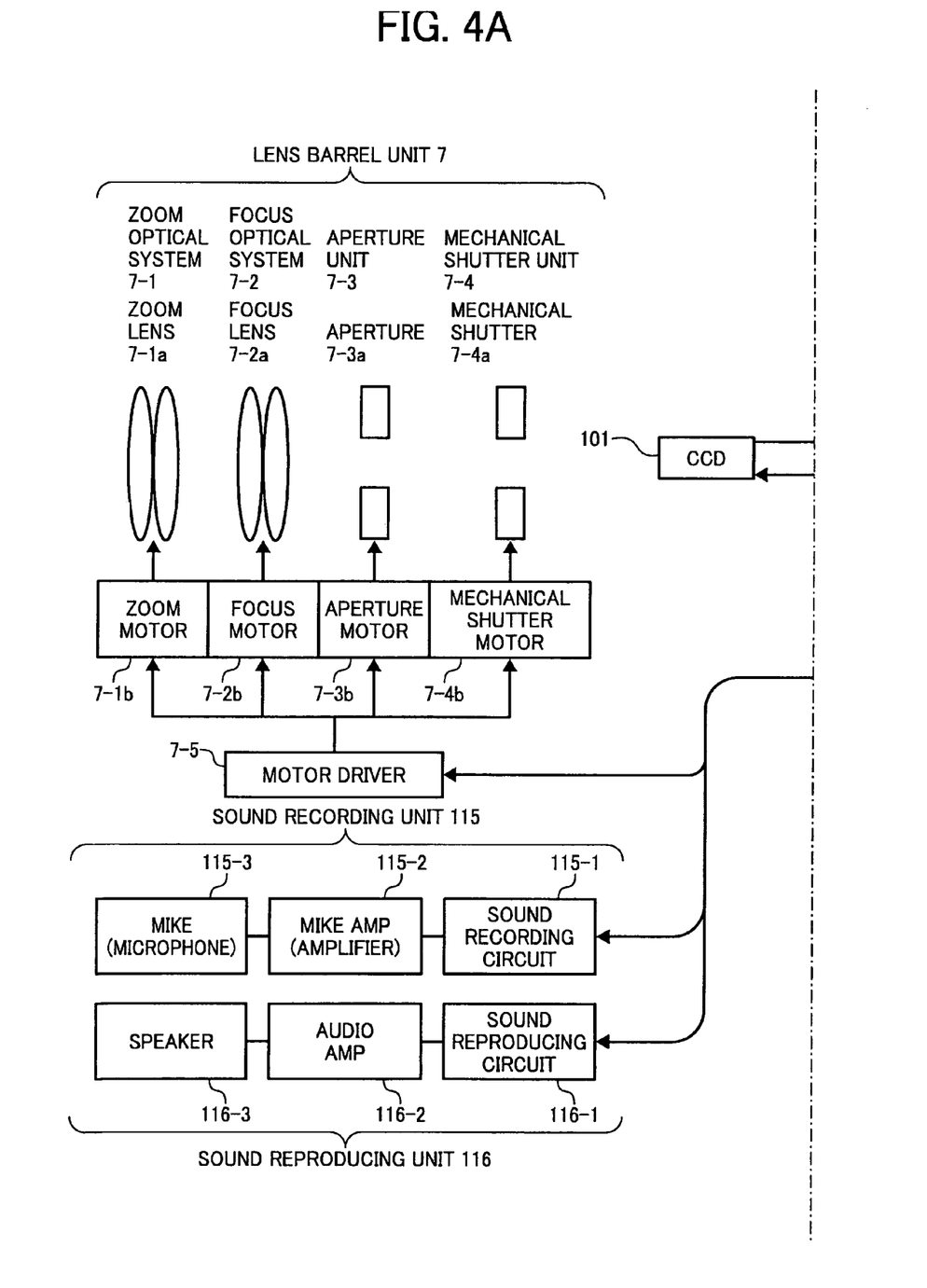
FIGS. 4A-4D are a block diagram illustrating an example of a structure of a controlling system of the camera as the imaging apparatus according to the embodiment 1 of the present invention.
Figure 4B:
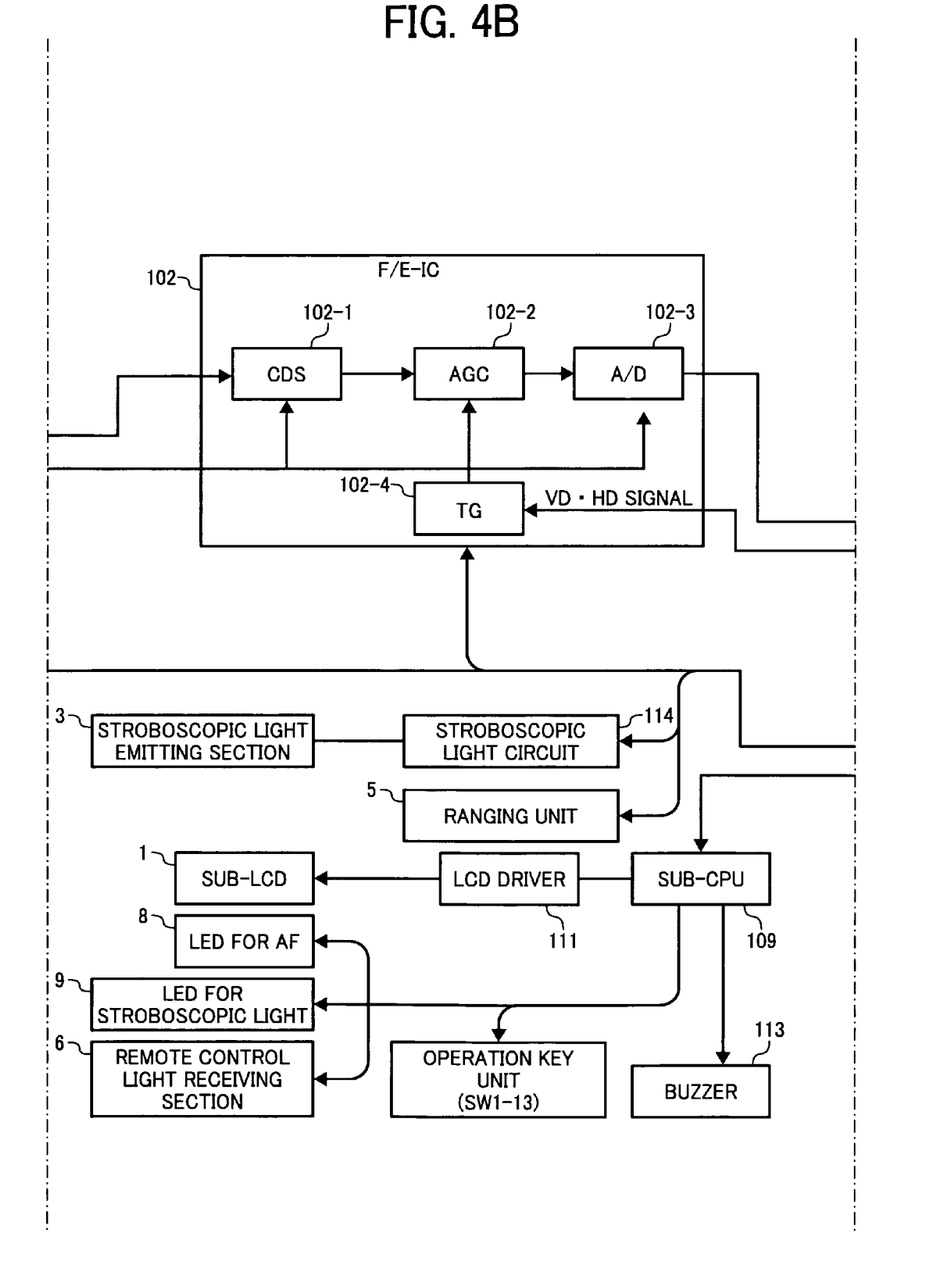
Figure 4C:
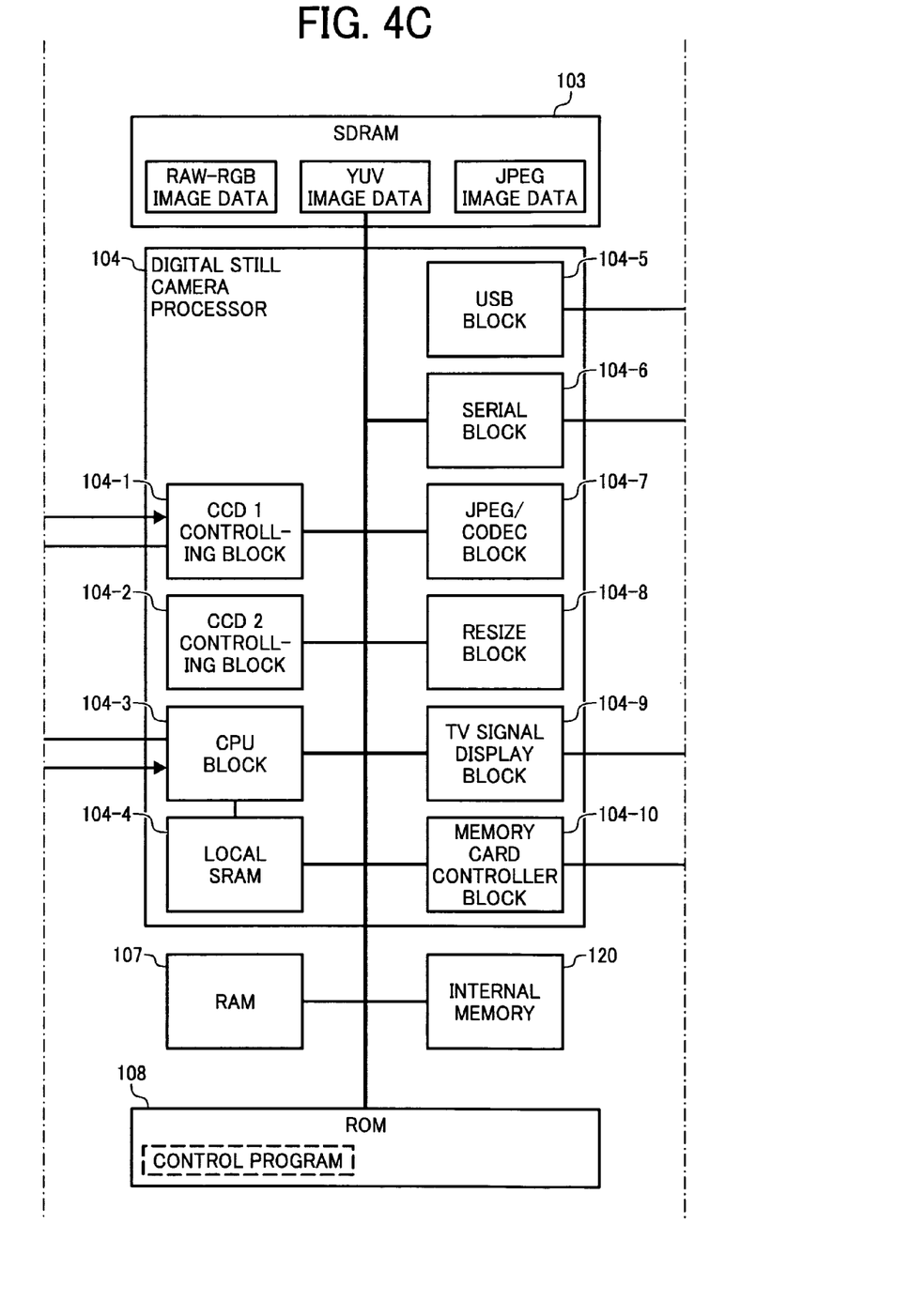
Figure 4D:
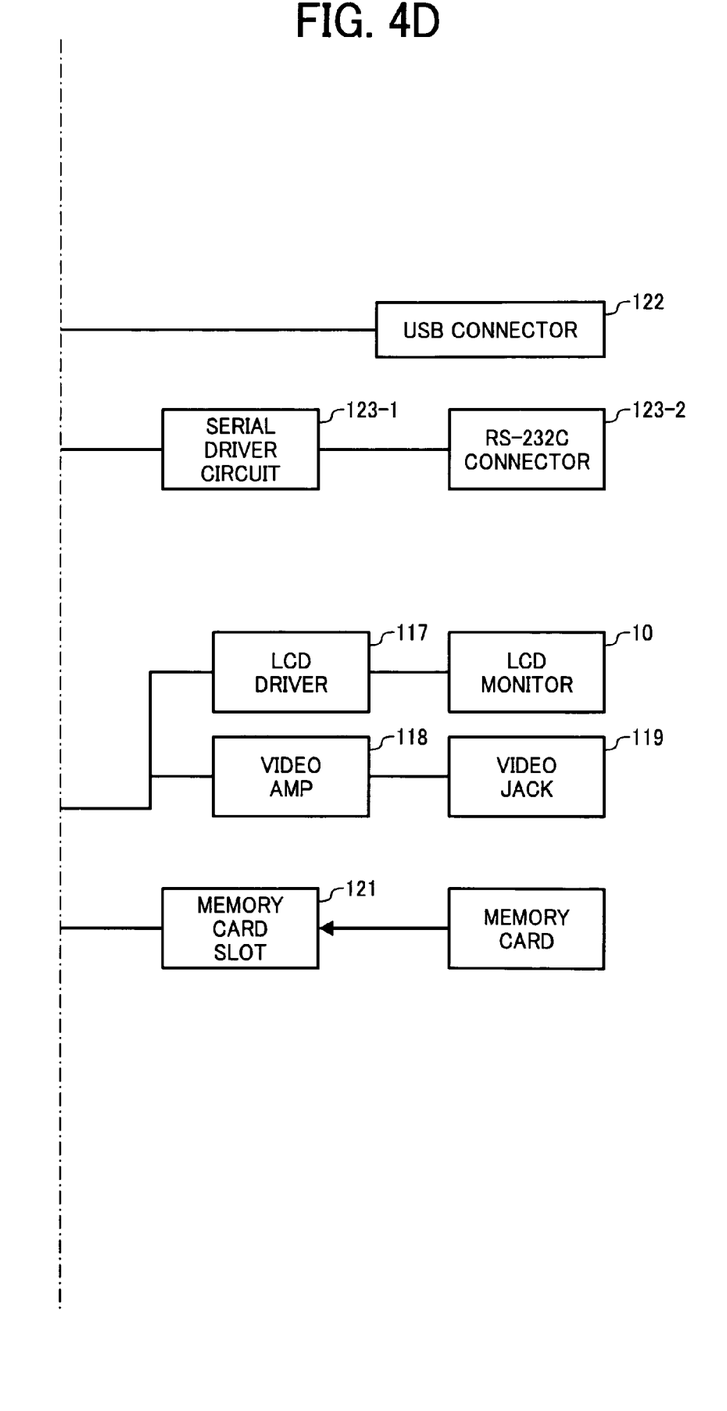

FIGS. 1 to 3 illustrate examples of external views of a digital camera as an imaging apparatus according to an embodiment of the present invention. FIGS. 1 to 3 respectively are a top view, a front view and a back view of the camera. In FIG. 1, a release shutter SW1, a mode dial SW2 and a sub-LCD (Liquid Crystal Display) 1 are placed on a top surface of the camera. In FIG. 2, a lens barrel unit 7, a remote control light receiving section 6, a ranging unit 5, a front surface of an optical finder 4, a stroboscopic light emitting section 3 and a lid for SD card/battery slot 2 are placed on a front surface of the camera. In FIG. 3, an eye piece of the optical finder 4, an LED (Light-Emitting Diode) display for AF (Autofocus) 8, an LED display for movement of stroboscopic light 9, a zoom switch (wide) SW3, a zoom switch (telephoto) SW4, a self-timer/delete switch SW5, a menu switch SW6, a stroboscopic light switch SW7, a right switch SW8, a display switch SW9, a macro switch SW10, a quick-access switch SW15, an image confirmation switch SW11, an OK switch SW12, an LCD monitor 10 and a power switch SW13 are placed on a back surface of the camera.

FIG. 4 is a block diagram illustrating an example of an electric processing system of the digital camera as the imaging apparatus according to the embodiment of the present invention. By using FIGS. 1 to 4, a structure and movement of the digital camera, which is an example of the imaging apparatus according to the embodiment of the present invention, will be explained.

The lens barrel unit 7 includes a zoom optical system 7-1, a focus optical system 7-2, an aperture unit 7-3, a mechanical shutter unit 7-4 and a motor driver 7-5. The zoom optical system 7-1 includes a zoom lens 7-1a which captures an optical image of a photographic subject and a zoom driving motor 7-1b which drives the zoom lens 7-1a. The focus optical system 7-2 includes a focus lens 7-2a and a focus driving motor 7-2b which drives the focus lens 7-2a. The aperture unit 7-3 includes an aperture 7-3a and an aperture motor 7-3b which drives the aperture 7-3a The mechanical shutter unit 7-4 includes a mechanical shutter 74a and a mechanical shutter motor 7-4b which drives the mechanical shutter 7-4a. The motor driver 7-5 drives each of the motors. The motor driver 7-5 is driven and controlled by a driving command from a CPU (Central Processing Unit) block 104-3 inside a digital still camera processor 104, which is described later, based on a signal inputted from the remote control light receiving section 6 or signals inputted by operations of an operating section Key unit SW1 to SW13.

The digital still camera processor 104 and a ROM (Read-Only Memory) 108 are connected by a bus line. In the ROM 108, a control program written in a readable code in the CPU block 104-3 and a parameter for controlling are stored. When the power of this digital camera is on, the program is loaded to a main memory, which is not illustrated, and the CPU block 104-3 controls movements of each section of the apparatus according to the program and temporarily saves necessary data for controlling and so on in a Local SRAM (Static Random Access Memory) 104-4 inside a RAM (Random Access Memory) 107 and the digital still camera processor 104. The control program and the parameter for controlling can be changed by using a rewritable flash ROM as the ROM 108. For example, even after purchasing the imaging apparatus, it is easily possible to upgrade a version of a function through a network and so on.

A CCD (Charge-Coupled Device) 101 is a solid-state image sensor in order to photoelectric-convert an optical image. AF/E (front-end)-IC (Integrated Circuit) 102 has a CDS (Correlated Double Sampling) 102-1, an AGC (Automatic Gain Control) 102-2, an A/D (Analog and Digital converter) 102-3 and a timing signal generator (hereinafter, simply called "TG") 102-4. The CDS 102-1 performs a correlated double sampling for an image noise reduction. The AGC 102-2 performs a gain adjustment. The A/D 102-3 performs a digital signal conversion. The TG 102-4 generates a timing signal for driving the CCD 101 and the F/E-IC 102. The CCD 101 and the F/E-IC 102 are supplied with a vertical synchronization signal (hereinafter, simply called "VD".) and a horizontal synchronization signal (hereinafter, simply called "HD".) from a CCD 1 controlling block 104-1 and are controlled by the CPU block 104-3.

The digital still camera processor 104 performs a white balance setting and a gamma setting on output data of the F/E-IC 102 from the CCD 101. The digital still camera processor has the CCD 1 controlling block 104-1, a CCD 2 controlling block 104-2, the CPU block 104-3, the Local SRAM 104-4, a USB block 104-5, a serial block 104-6, a JPEG CODEC block 104-7, a RESIZE block 104-8, a TV signal display block 104-9 and a memory card block 104-10. The CCD 1 controlling block 104-1 supplies the VD signal and the HD signal as described above. The CCD 2 controlling block 104-2 performs conversions into luminance data and color difference data by a filtering process. The CPU Block 104-3 controls movements of each section of the apparatus described above. The Local SRAM 104-4 temporarily saves necessary data for controlling as described above and so on. The USB block 104-5 performs a USB communication with external devices such as a personal computer and so on. The serial block 104-6 performs serial communication with external devices such as a personal computer and so on. The JPEG CODEC block 104-7 performs JPEG compression and expansion. The RESIZE block 104-8 enlarges and reduces a size of image data by performing an interpolation process. The TV signal display block 104-9 converts image data into a video signal for displaying on external display devices such as an LCD monitor, a TV and so on. The memory card block 104-10 controls a memory card for recording photographed image data.

An SDRAM (Synchronous Dynamic Random Access Memory) 103 temporarily saves image data, when various processes are performed on image data in the digital still camera processor 104 described above. The image data to be saved, for example, are captured from the CCD 101 via the F/E-IC 102, and are "RAW-RGB image data", "YUV image data", "JPEG image data" and so on. The RAW-RGB image data is in a state in which a white balance setting and a gamma setting are performed in the CCD 1 controlling block 104-1. The YUV image data is in a state in which conversions into luminance data and color difference data are performed in the CCD 2 controlling block 104-2. The JPEG image data is image data on which a JPEG compression is performed in the JPEG CODEC block 104-7.

A memory card slot 121 is a slot for loading a detachable memory card. An internal memory 120 is a memory for memorizing photographed image data, when a memory card is not loaded in the memory card slot 121. An LCD monitor driver 117 is a driving circuit for driving the LCD monitor 10, which is described later, and also has a function of converting a video signal outputted from the TV signal display block 104-9 into a signal for displaying on the LCD monitor 10. The LCD monitor 10 is a display for observing a state of a photographic subject before photographing, for confirming a photographed image, for displaying a recorded image in a memory card, the internal memory 102 or the like.

A video AMP (amplifier) 118 is an amplifier for converting the video signal outputted from the TV signal display block 104-9 into Impedance 75Ω. A video jack 119 is a jack for connecting with external devices such as a TV and so on. A USB connector 122 is a connector for performing a USB connection with external devices such as a personal computer and so on.

A serial driver circuit 123-1 is a circuit for performing a voltage conversion on an output signal from the serial block 104-6 in order to perform a serial communication with external devices such as a personal computer and so on. An RS-232C connector 123-2 is a connector for performing a serial connection with external devices such as a personal computer and so on.

A SUB-CPU 109 is a CPU having built-in ROM and RAM in one chip, and outputs output signals of the operation Key unit SW1 to SW13 or of the remote control light receiving section 6 as information about a user's operation to the CPU block 104-3 described above. Additionally, the SUB-CPU 109 converts a signal indicating a state of the camera outputted from the CPU block 104-3 described above into controlling signals of the sub-LCD 1, the LED for AF 8, the LED for the stroboscopic light 9 and a buzzer 113, and then outputs. The sub-LCD 1 is a display section for displaying, for example, the number of photographable shots and so on. The LCD driver 111 is a drive circuit for driving the sub-LCD 1 by the outputted signal from the SUB-CPU 109 described above.

The LED for AF 8 is an LED for displaying a focusing state when photographing. The LED for the stroboscopic light 9 is an LED for displaying a charged state of the stroboscopic light 9. In addition, these LEDs for AF 8 and for the stroboscopic light 9 can be used for other display purposes, for example, for displaying "accessing memory card" and so on. The operation Key unit SW1 to SW13 is a Key circuit for users to operate. The remote control receiving light section 6 is a section for receiving a signal of a remote controller operated by a user.

A sound recording unit 115 includes a mike (microphone) 115-3, a mike AMP (amplifier) 115-2 and a sound recording circuit 115-1. A sound signal is inputted to the mike 115-3 by a user. The mike AMP 115-2 amplifies the inputted sound signal. The sound recording circuit 115-1 records the amplified sound signal. A sound reproducing unit 116 includes a sound reproducing circuit 116-1, an audio AMP 116-2 and a speaker 116-3. The sound reproducing circuit 116-1 converts the recorded sound signal into a signal which can be outputted from the speaker. The audio AMP 116-2 amplifies the converted sound signal and drives the speaker. The speaker 116-3 outputs the amplified sound signal.

[An Explanation of an AE (Automatic Exposure) Movement]

Movement of the camera as the imaging apparatus structured as described above will be explained. When the release shutter SW1 is half-pressed and is on, the CPU 104-3 performs an AE movement. Specifically, in the AE movement, when a face detection movement mode is being set, first of all, a face detection process is performed and a face of a person is detected. In particular, after image data inputted from the CCD 101 is processed in the F/E-IC 102 including the CDS 102-1, the AGC 102-2 and the A/D 102-3, the image data processed by the F/E-IC 102 is inputted to the digital still camera processor (Hereinafter, simply called DSP.) 104. This image data, after signal processing in the DSP 104, is written in the SDRAM 103. The CPU 104-3 uses well-known face detection techniques (For example, Gabor wavelet transform+a graph matching) and detects the face of the person from the image data stored in the SDRAM 103. A detected face of the person is regarded as a light metering area (AE area), and the CPU 104-3 calculates an AE evaluated value (light metering result). Additionally, the CPU 104-3 calculates an exposure-amount based on this AE evaluated value, sets exposure conditions according to this exposure-amount and performs an exposure control. The exposure conditions are as follows:

an electric shutter speed of the CCD 101;
an aperture value of the aperture 7-3a of the lens barrel unit 7;
a gain of the AGC circuit 102-2 of the F/E-IC 102, and so on.

Figure 5:
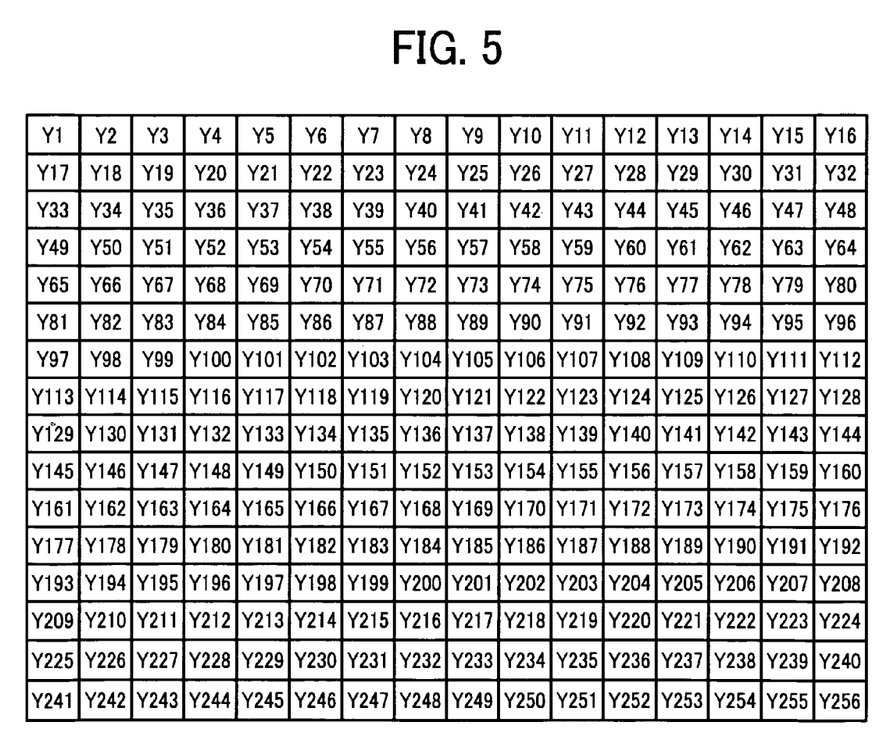
FIG. 5 is a front view of an example of an image frame, which is divided into a plurality of areas, of an imaging sensor which can be used for the imaging apparatus according to the embodiment 1 of the present invention.
Figure 6:
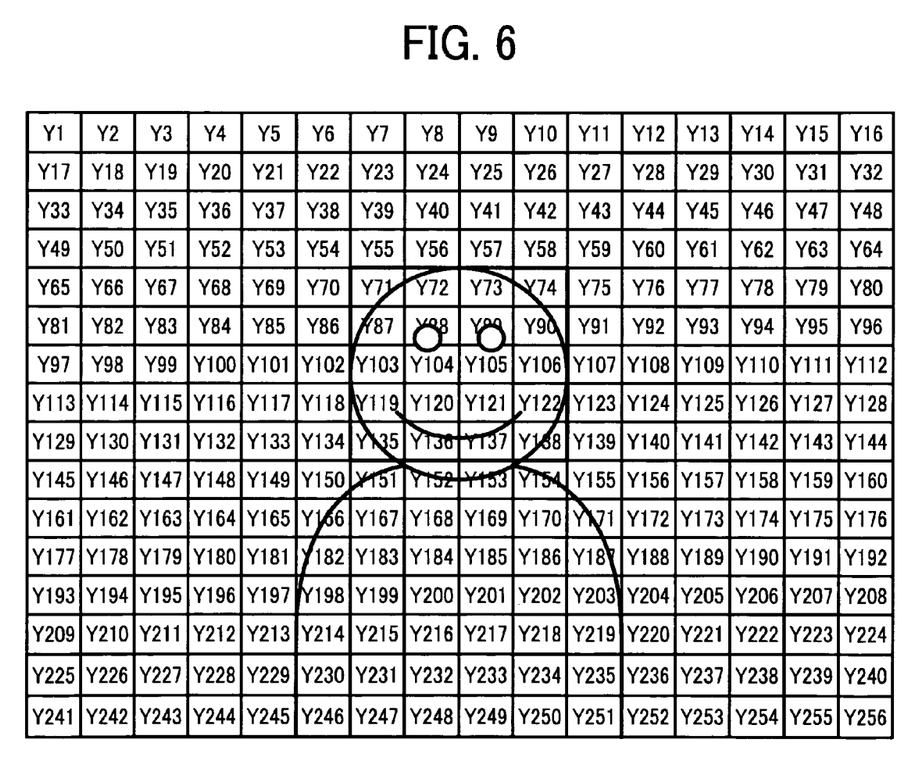
FIG. 6 is a front view illustrating an example of an image of a photographic subject displayed on the image frame divided into the plurality of the areas.

A calculating method of the AE evaluated value will be explained specifically. FIG. 5 illustrates an example where an image plane (image frame) of the CCD 101 is divided into a plurality of areas Y1 to Y256. FIG. 6 illustrates an example where an image of a photographic subject is displayed on the image frame as illustrated in FIG. 5.

The DSP 104 calculates luminance data Y1 to Y256 per area of the plurality of the areas Y1 to Y256 regarded as an object for the light metering, based on the image data inputted from the CCD 101 (each pixel data (R, G and B)). Calculating formulas of the luminance data are described below. In the following calculating formulas, $Rn$, $Gn$ and $Bn$ represent average values of each pixel data (R, G and B) in each area.

$$Y1 = 0.299R1 + 0.587G1 + 0.114B1 \quad \text{Area 1}$$

$$Y2 = 0.299R2 + 0.587G2 + 0.114B2 \quad \text{Area 2}$$

.

.

$$Yn = 0.299Rn + 0.587Gn + 0.114Bn \quad \text{Area n}$$

Here, in a case of the face detection movement mode, when a light metering process is performed on only a face, each luminance data of areas including the face is calculated and an average value of the calculated luminance data of the areas is regarded as luminance data Yy (AE evaluated value). For example, in an example illustrated in FIG. 6, the average value of the luminance data of the areas of Y88, Y89, Y104, Y105, Y120 and Y121 is regarded as the luminance data Yy (AE evaluated value).

Additionally, in the case of the face detection movement mode, when the light metering process is performed on a face part and an entire image plane, each luminance data of areas including the face is calculated and an average value of the calculated luminance data of the areas is regarded as luminance data Yface. In addition, each luminance data of areas of the entire image plane Y1 to Y256 is calculated and an average value of the calculated luminance data of all areas is regarded as luminance data Yall. And when a weighting for the face part is regarded as n1 and a weighting for the entire image plane is regarded as n2 (Note: n1>n2, n1+n2=1), the luminance data Yy (AE evaluated value) is calculated by the following calculating formula:

$$Yy = Yface \times n1 + \text{luminance data } Yall \times n2.$$

In the case of a general light metering process, the luminance data (AE evaluated value) is calculated by using any one of the following methods below.

1. A center-weighted metering method:
Luminance data is determined such that brightness in a central part is weighted and brightness around the central part is taken into account.

2. A partial metering method:

Luminance data is determined only by an average value of luminance data of only an area inside of an image plane.

3. A spot metering method:

The principle of the spot metering method is the same as the partial metering method, however, a light metering area is smaller, at about 1% to 2%, comparing to the partial metering method.

4. A multi-light metering method:

An image plane is divided into a plurality of areas, an average value of luminance is calculated per area and luminance data is determined based on those distribution patterns of luminance.

The CPU 104-3, when a value of target luminance data Yx stored in the ROM 108 beforehand corresponds to a value of luminance data of a photographic subject Yy as a light meter test result of the photographic subject, judges an exposure (brightness) to be appropriate. And the CPU 104-3 calculates an exposure-amount such that the luminance data of the photographic subject Yy becomes the target luminance data Yx. Based on the calculated exposure-amount, the CPU 104-3 sets exposure conditions, that is to say, a shutter speed of the CCD 101, an aperture value of an aperture of the lens barrel unit 7 and a sensitivity of the CCD 101 (a gain value of an amplifier circuit of the F/E-IC 102).

In particular, when making the value of the luminance data Yy larger, the CPU 104-3 performs any one of (or a plurality of) the following below.

Making the shutter speed of the CPU 104-3 slower.

Making a size of the aperture larger.

Making the sensitivity of the CCD 101 higher.

On the contrary, when making the value of the luminance data Yy smaller, the CPU 104-3 performs the opposite to those described above.

[Face Detection Methods]

Next, face detection methods will be explained. Some techniques as described below are known as face detection methods for detecting an image of a person's face from a photographic subject image. In the present embodiment, any one of the methods described below is used.

1. A method in which a color image is converted into a mosaic image, its skin-colored area is focused on and a face area is extracted, as described in "A Proposal of the Modified HSV Colour System Suitable for Human Face Extraction" on pages 787 to 797 of The Journal of the Institute of Television engineers of Japan Vol. 49, No. 6 (1995).

2. A method in which a feature of a geometric shape about each part of a head of a person facing the front including hair, eyes, mouth and so on is used and the head area of the person facing the front is extracted, as described in "Extraction of Face Regions from Monochromatic Photographs" on pages 1625 to 1627 of The Journal of the Institute of Electronics, Information and Communication Engineers Vol. 74-D-II, No. 11 (1991).

3. A method in which in a case of a motion picture, an outline edge of a person's image occurring by a subtle movement of the person between frames is used and the image of the person facing the front is extracted, as described in "A Face Region Detection for a TV Phone and Its Effect" of IMAGE LAB 1991-11 (1991) published by Japan Industrial Publishing Co, Ltd.

Figure 7:
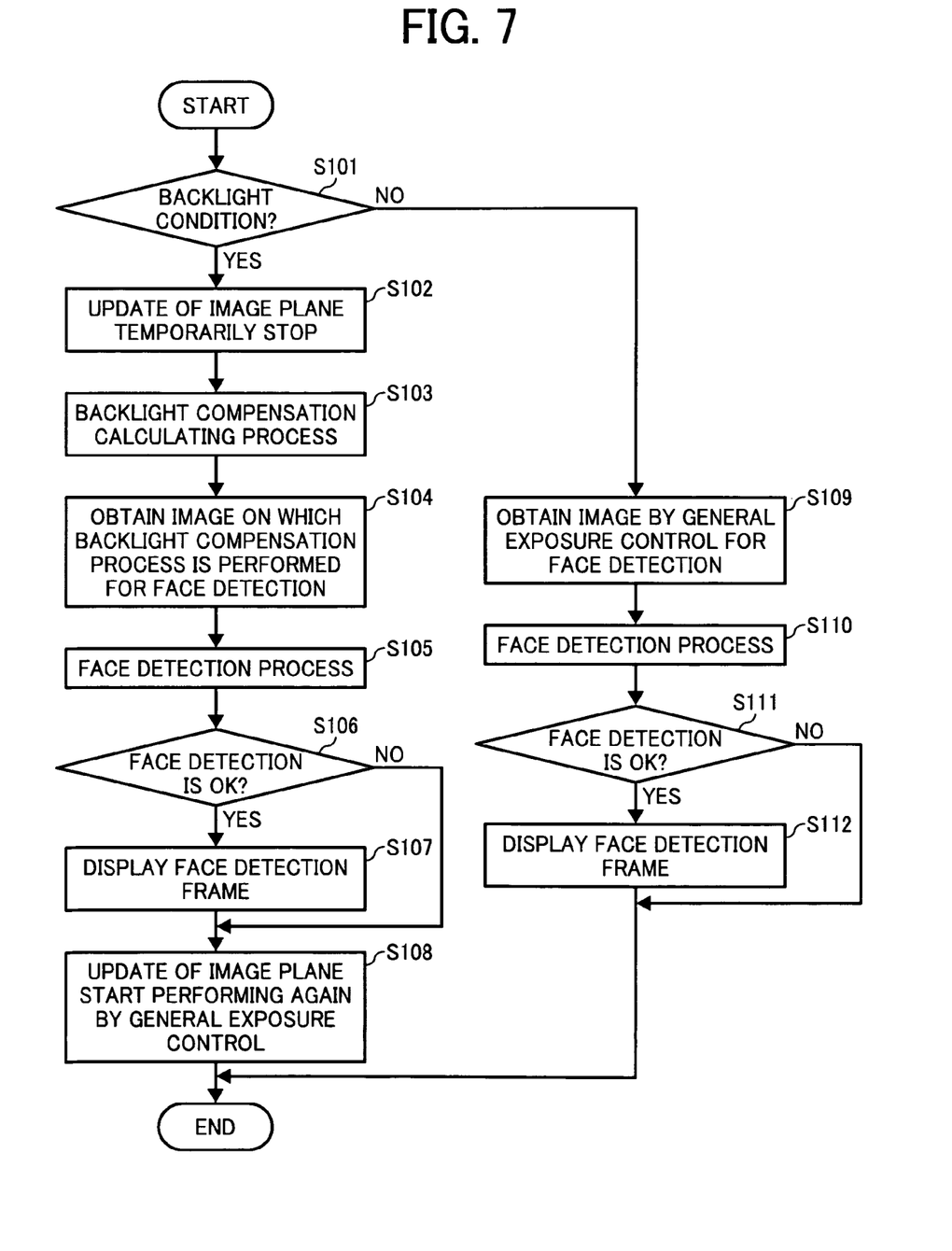
FIG. 7 is a flowchart illustrating movement of the imaging apparatus according to the embodiment 1 of the present invention.
Figure 8A:
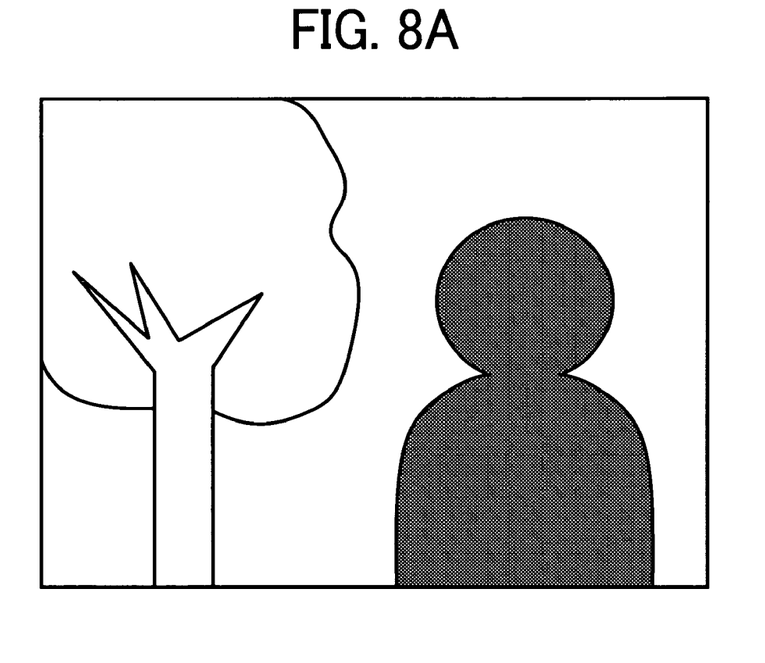
FIG. 8A illustrates a monitoring image in backlight conditions displayed on a monitor of the imaging apparatus according to an embodiment 2 of the present invention, and is an example before backlight compensation.
Figure 8B:
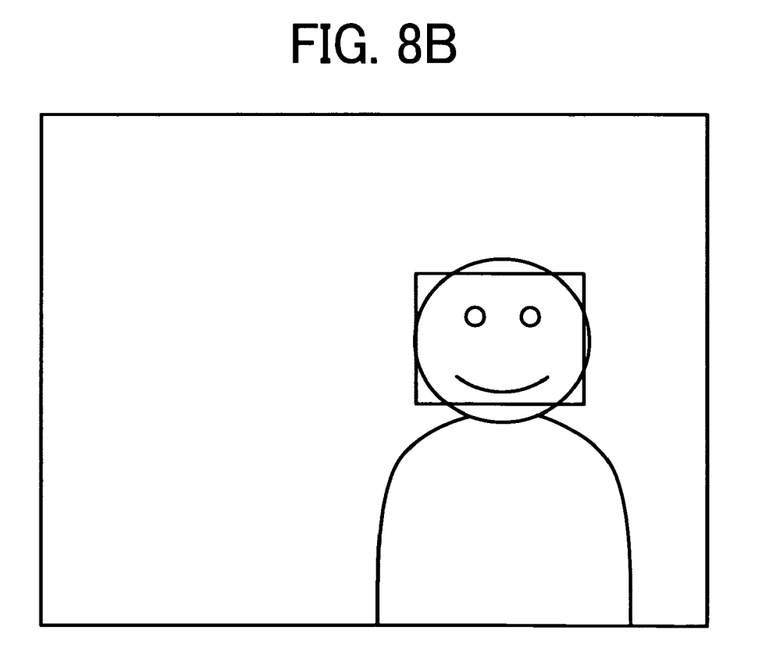
FIG. 8B illustrates the monitoring image in the backlight conditions displayed on the monitor of the imaging apparatus according to the embodiment 2 of the present invention, and is an example of an image for a face detection which is obtained by an exposure control after the backlight compensation.

Hereinafter, referring to FIGS. 7 and 8, movements from a detection of backlight conditions to a face detection, moreover, to an exposure control based on these detections, in the embodiment 1, will be explained. In FIG. 7, first of all, the CPU 104-3 (See FIG. 4) judges if photographing conditions are backlight conditions or not (step S101). Here, for example, a luminance difference between a bright area and a dark area in an image is used in a judgment of the backlight conditions. As a result of this judgment, when the photographing conditions are judged to be the backlight conditions, the CPU 104-3 temporarily stops updating of an image plane display on the LCD monitor 10 (step S102).

Then, the CPU 104-3 performs a backlight compensation calculating process and calculates an exposure control value so as not to darken a face, even in the backlight conditions (step S103). An image which is generated based on the exposure control value calculated in the step S103 is obtained as an image for a face detection (step S104). FIG. 8A illustrates an example of image data (a displaying image) which is displayed on the LCD monitor 10. FIG. 8B illustrates an example of the image obtained for the face detection, in which an exposure control for backlight compensation is performed on the image of FIG. 8A. This exposure control for the backlight compensation is referred to as a first exposure control. Thus, in the image obtained by performing the exposure control for the backlight compensation (FIG. 8B), a face of a person is not darkened but comes out brightly and the background is overexposed. The face detection process is performed by using the image obtained by performing the exposure control for the backlight compensation (step S105). When a face is detected (YES of S106), a face detection frame is displayed for the detected face on the LCD monitor 10 (step S107). A face area of the person in this face detection frame is subjected to a light meter test as a light metering area, and based on this light meter test result, an update of an image plane display on the LCD monitor 10 is started again by a general exposure control (step S108). An exposure control based on the light meter test result, in which the face area of the person is subjected to a light meter test as the light metering area, is referred to as a second exposure control. When a face is not detected (NO of S106), a flow is moved to the step S108 and the update of the image plane display on the LCD monitor 10 is started again by the general exposure control. In FIG. 8B, a rectangular shape displayed on a part corresponding to the face denotes the face detection frame.

In the step S101, when the photographic conditions are judged not to be the backlight conditions, an image which is generated by the general exposure control is obtained as the image for the face detection (step S109), and the face detection is performed (step S110). When a face is detected (YES of S111), the face detection frame is displayed for the detected face (step S112). When a face is not detected (NO of S111), the face detection movement is ended without displaying the face detection frame.

As described above, according to the embodiment 1 of the present invention, when the CPU 104-3 judges that the photographing conditions are the backlight conditions, the image obtained by performing the exposure control for the backlight compensation is obtained as the image for detecting a face. Therefore, it is easy to detect the face without being darkened.

Embodiment 2

Figure 9A:
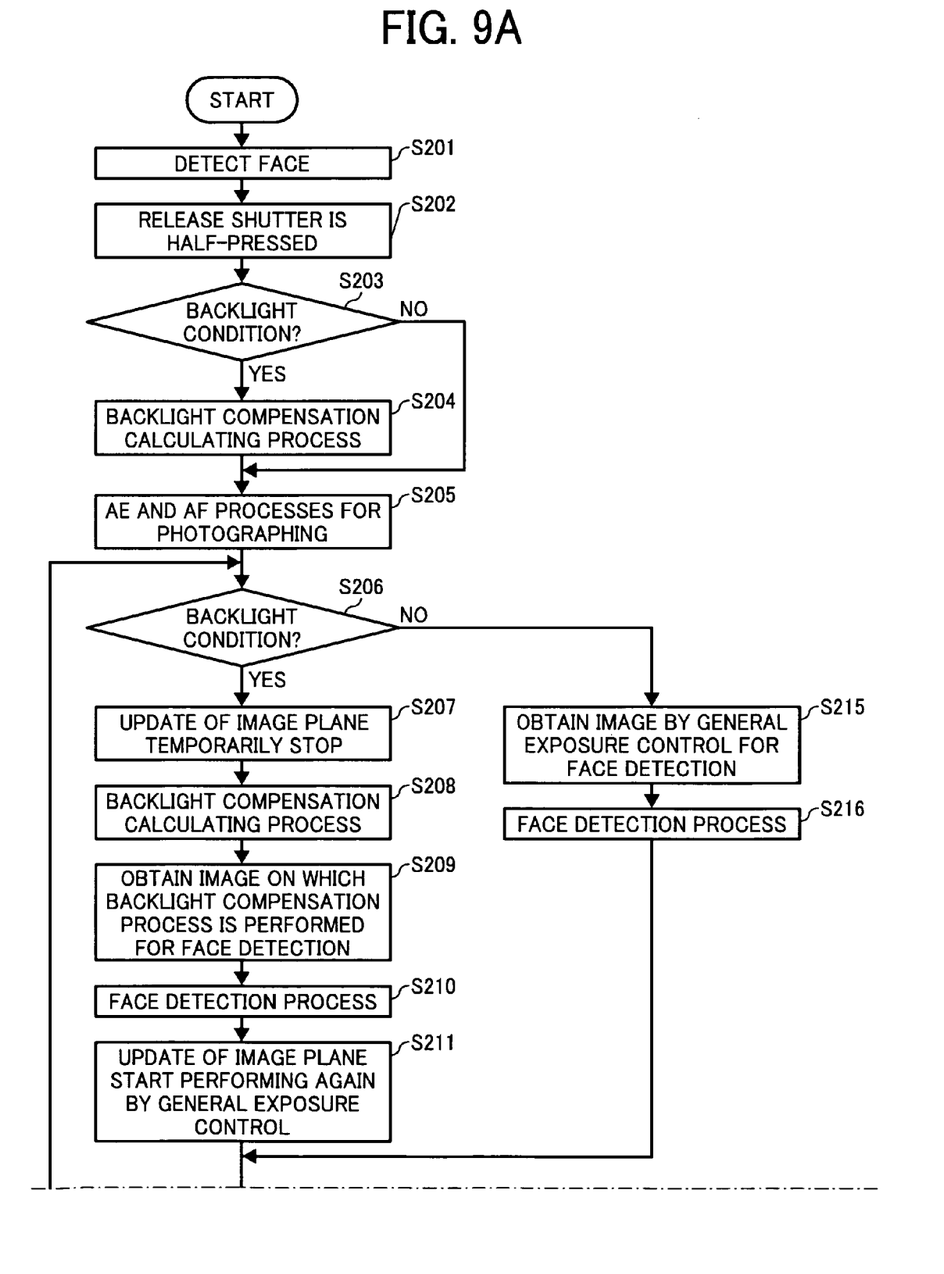
FIGS. 9A-9B are a flowchart illustrating movement of the imaging apparatus according to the embodiment 2 of the present invention.
Figure 9B:
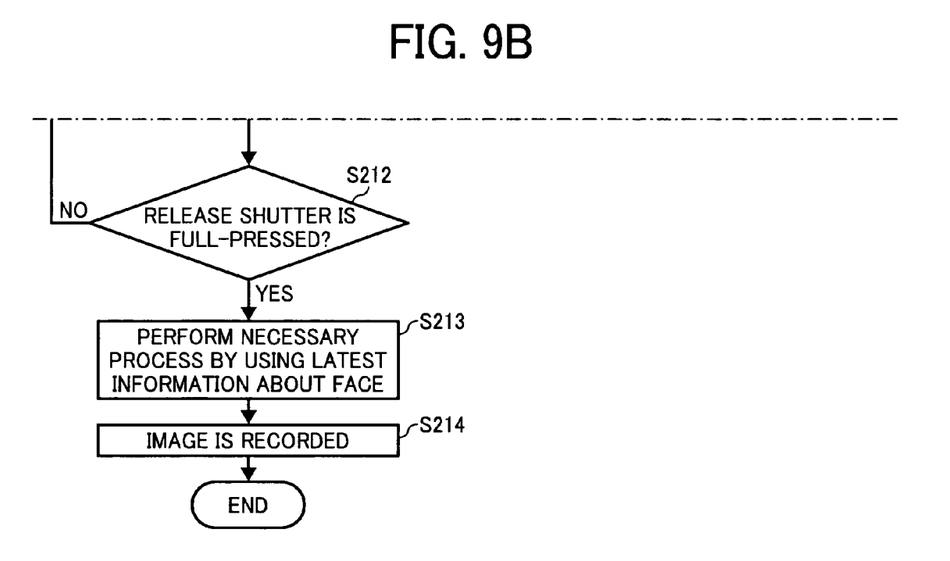

Referring to FIG. 9, a digital camera as an imaging apparatus according to the embodiment 2 of the present invention will be explained. A hardware structure of the digital camera according to the embodiment 2 can be the same as the structure of the embodiment 1. In the digital camera according to the embodiment 2, after the release shutter SW1 is half-pressed and an AE process for photographing is performed, and additionally when the face detection process is continued, the photographing conditions are judged to determine if they are the backlight conditions or not And when necessary, the image obtained by performing the backlight compensation process is obtained as the image for the face detection.

FIG. 9 illustrates a flowchart for explaining the AE movement of the digital camera according to the embodiment 2. The AE movement of the digital camera according to the embodiment 2 will be explained in accordance with the flowchart of FIG. 9. In FIG. 9, first of all, the CPU 104-3 detects the face of the person while displaying (step S201). When the release shutter SW1 is half-pressed (step S202), the CPU 104-3 judges if the photographing conditions are the backlight conditions or not (step S203). When the photographing conditions are judged to be the backlight conditions (YES of S203), the backlight compensation calculating process (step S204) and AE and AF processes for photographing (step S205) are performed. In the step S203, when the photographing conditions are judged not to be the backlight conditions (NO of S203), a flow is moved to the step S205 without performing the backlight compensation calculating process, and the AE and AF processes for photographing are performed.

In the embodiment 2, the face detection process is continued even after performing the AE and AF processes for photographing. After performing the AE and AF processes for photographing, in the step S206 the photographing conditions are judged if they are the backlight conditions or not. When they are judged to be the backlight conditions (YES of S206), the update of the image plane on the LCD monitor 10 is temporarily stopped (step S207). And the backlight compensation calculating process is performed (step S208), and the image on which the backlight compensation process is performed is obtained as the image for the face detection (step S209). A functional part for performing the exposure control based on a result in which the backlight compensation process is performed is referred to as a first exposure control. The face detection process is performed on the image obtained by performing the backlight compensation process (step S210) and the update of the image plane on the LCD monitor 10 is started again (step S211). Next, the release shutter SW1 is judged if it is full-pressed or not (step S212). When the release shutter SW1 is judged to be full-pressed (YES of S212), a calculating process is performed by using the latest information about the face when necessary and the image is recorded based on the exposure control value of the AE for photographing calculated in the step S205 (step S214). An exposure controller of this case is referred to as a second exposure control. In the step S212, until the release shutter SW1 is full-pressed (NO of S212), the process is moved back to the step S206 and the face detection process is repeated.

In the step S206, the photographing conditions are judged not to be the backlight conditions (NO of S206), the update of the image plane on the LCD monitor 10 is just continued, the image, on which the general exposure control is performed, is obtained as the image for the face detection (step S215), and the face detection process is performed on the obtained image (step S216).

As described above, according to the embodiment 2 of the present invention, the CPU 104-3, even after the release shutter SW1 is half-pressed, and even when the photographing conditions are the backlight conditions, can detect a person's face of a photographic subject. And when the release shutter SW1 is full-pressed and the image is recorded, an appropriate image can be obtained by using the latest information about the face.

For example, backlight judging means, first exposure controlling means, face detecting means, second exposure controlling means and so on are incorporated in the control program as software to perform a predetermined movement in the ROM 108.

For example, according to the embodiments described above, the following effects are also obtained.

Even when the photographing conditions are the backlight conditions and the face of the person is darkened, the exposure control, on which the compensation corresponding to the backlight conditions is performed, is performed, so that the face of the person can be accurately detected. And the second exposure control performs the exposure control based on the light meter test result of the face of the person, therefore it is possible to photograph at an accurate exposure-amount corresponding to the brightness of the face of the person.

According to the structure of the embodiments of the present invention as described above, when the face detection is performed by the exposure control by the first exposure control, the display on the monitor is the image on which the exposure control by the general exposure control is performed, so that it is possible to prevent the image on the monitor from changing drastically. Additionally, the backlight judging means judges if the photographic conditions are the backlight conditions or not by a luminance difference between a bright area and a dark area in the image, therefore even when a person who is a photographic subject is in an edge of an image plane, it is possible to judge if the photographic conditions are the backlight conditions or not.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An imaging apparatus having an automatic exposure function, comprising:
    an imaging section which images a photographic subject, and which obtains image data according to the photographic subject; and
    a controller including:
        a backlight judging section which judges whether or not imaging conditions at the time of imaging by the imaging section are backlight conditions;
        a first exposure controlling section which performs a first exposure control in which a compensation for the backlight conditions is performed when the imaging conditions are judged to be the backlight conditions;
        a face detecting section which detects a face of a person based on the image data obtained by the imaging section and the first exposure controlling section;
        a light metering section which performs a light meter test on a face area of the detected face of the person as a light metering area; and
        a second exposure controlling section which performs a second exposure control in which an exposure-amount based on a result of the light meter test of the face of the person is calculated, and in which an exposure control for recording is performed based on the calculated exposure-amount,
    wherein when the imaging conditions at the time of imaging are judged to be backlight conditions by the backlight judging section, the face detecting section performs face detection on the image data obtained by the imaging section based on the image data obtained by performing the first exposure control for the backlight compensation by the first exposure controlling section.

2. An imaging apparatus according to claim 1, further comprising a display that displays an image,
wherein the controller performs a general exposure control for the image displayed on the display when the face of the person is detected by the first exposure control.

3. An imaging apparatus according to claim 1, wherein the backlight judging section judges whether or not the imaging conditions are the backlight conditions by a luminance difference between a bright area and a dark area of the image data.

4. An imaging apparatus according to claim 1, wherein the backlight judging section judges whether or not the imaging conditions are backlight conditions and the first exposure controlling section performs the first exposure control when a shutter button is half-pressed.

5. An imaging apparatus according to claim 4, wherein the backlight judging section judges whether or not the imaging conditions are the backlight conditions, the first exposure controlling section performs the first exposure control, the face detecting section detects the face of the person, the light metering section performs the light meter test on the face area of the detected face of the person, and the second exposure controlling section performs the second exposure control after the shutter button is half-pressed.

6. An imaging apparatus according to claim 5, wherein the controller obtains the latest image data according to the photographic subject from the imaging section, the backlight judging section judges whether or not the imaging conditions are the backlight conditions, the first exposure controlling section performs the first exposure control based on the first exposure control performed when the shutter button is half-pressed, the face detecting section detects the face of the person, the light metering section performs the light meter test on the face area of the detected face of the person, and the second exposure controlling section performs the second exposure control, when the shutter button is full-pressed.

7. An automatic exposure control method for an imaging apparatus, the method comprising:
imaging a photographic subject and obtaining image data according to the photographic subject;
judging whether or not imaging conditions at the time of imaging are backlight conditions;
performing a first exposure control in which a compensation for the backlight conditions is performed when the imaging conditions are judged to be the backlight conditions;
detecting a face of a person based on the image data and the first exposure control;
performing a light meter test on a face area of the detected face of the person as a light metering area; and
performing a second exposure control in which an exposure-amount based on a result of the light meter test of the face of the person is calculated, and in which an exposure control for recording is performed based on the calculated exposure-amount,
wherein when the imaging conditions at the time of imaging is judged to be backlight conditions, said detecting a face step performs face detection on the image data obtained by the imaging section based on the image data obtained by performing the exposure control for the backlight compensation.

8. An automatic exposure control method according to claim 7, further comprising:
displaying an image on a display by performing a general exposure control, when the face of the person is detected by the first exposure control.

9. An automatic exposure control method according to claim 7, wherein whether or not the imaging conditions are the backlight conditions is judged by a luminance difference between a bright area and a dark area of the image area.

10. An automatic exposure control method according to claim 7, wherein judging of whether or not the imaging conditions are the backlight conditions and performing of the first exposure control are carried out when a shutter button is half-pressed.

11. An automatic exposure control method according to claim 10, wherein judging of whether or not the imaging conditions are the backlight conditions, performing of the first exposure control, detecting of the face of the person, performing of the light meter test on the face area of the detected face of the person, and performing of the second exposure control, are carried out after the shutter button is half-pressed.

12. An automatic exposure control method according to claim 11, wherein obtaining of the latest image data according to the photographic subject from the imaging section, judging of whether or not the imaging conditions are the backlight conditions, performing of the first exposure control based on the first exposure control performed when the shutter button is half-pressed, detecting of the face of the person, performing of the light meter test on the face area of the detected face of the person, and performing of the second exposure control, are carried out when the shutter button is full-pressed.

13. An imaging apparatus having an automatic exposure function, comprising:
imaging means for imaging a photographic subject, and for obtaining image data according to the photographic subject;
backlight judging means for judging whether or not imaging conditions at the time of imaging by the imaging means are backlight conditions;
first exposure controlling means for performing a first exposure control in which a compensation for the backlight conditions are performed when the imaging conditions are judged to be the backlight conditions by the backlight judging means;
face detecting means for detecting a face of a person based on the image data obtained by the imaging means and the first exposure controlling means;
light metering means for performing a light meter test on a face area of the face of the person detected by the face detecting means as a light metering area; and
second exposure controlling means for performing a second exposure control in which an exposure-amount based on a result of the light meter test of the face of the person by the light metering means is calculated, and in which an exposure control for recording is performed based on the calculated exposure-amount,
wherein when the imaging conditions at the time of imaging is judged to be backlight conditions by the backlight judging means, the face detecting means performs face detection on the image data obtained by the imaging means based on the image data obtained by performing the exposure control for the backlight compensation by the first exposure controlling means.

* * * * *